US010333433B2

(12) United States Patent
Mesa

(10) Patent No.: US 10,333,433 B2
(45) Date of Patent: Jun. 25, 2019

(54) GRAPHENE ENHANCED PIEZOELECTRIC ARTICLE OF MANUFACTURE, SYSTEM AND METHOD OF ENERGY GENERATOR AND STORAGE CELL

(71) Applicant: Gabriel Hunter Mesa, Canton, CT (US)

(72) Inventor: Gabriel Hunter Mesa, Canton, CT (US)

( * ) Notice: Subject to any disclaimer, the term of this patent is extended or adjusted under 35 U.S.C. 154(b) by 558 days.

(21) Appl. No.: 15/004,875

(22) Filed: Jan. 22, 2016

(65) Prior Publication Data

US 2016/0218642 A1 Jul. 28, 2016

Related U.S. Application Data

(60) Provisional application No. 62/106,383, filed on Jan. 22, 2015.

(51) Int. Cl.
*H01L 41/113* (2006.01)
*H02N 2/18* (2006.01)

(52) U.S. Cl.
CPC ..................... *H02N 2/18* (2013.01)

(58) Field of Classification Search
CPC ................ H02N 2/18; H01L 41/113

USPC ........................................... 310/339
See application file for complete search history.

(56) References Cited

U.S. PATENT DOCUMENTS 8,269,401 B1 9/2012 Kim et al.

FOREIGN PATENT DOCUMENTS

CN 102683573 A 9/2012

*Primary Examiner* — Thomas M Dougherty
(74) *Attorney, Agent, or Firm* — Damian Wasserbauer, Esq.; Wasserbauer Law LLC

(57) ABSTRACT

The present invention provides a graphene enhanced piezoelectric article of manufacture, system and method of energy generation electrical energy and an electrical charge obtained from environmental motion forces present in the environment that may be collected and stored. The graphene enhanced piezoelectric generator device is configured to utilize a supersatuatrated liquid solution enhanced with graphene to interact with piezoelectric material to generate the electrical charge to provide a self-powered system. The combination of solid graphene in a liquid suspension with piezoelectric materials, an enclosure forming a biodegradable housing, an agitator disposed in the enclosure for interacting with the liquid solution to create mechanical stress, and an electrical circuit using a capacitor has been designed with application in generation of renewable energy for use using mechanical motion from sources in nature available to such person.

7 Claims, 3 Drawing Sheets

GRAPHENE ENHANCED PIEZOELECTRIC ARTICLE OF MANUFACTURE, SYSTEM AND METHOD OF ENERGY GENERATOR AND STORAGE CELL

CROSS-REFERENCE TO RELATED APPLICATION

This application claims the benefit of U.S. Provisional Application No. 62/106,383, filed Jan. 22, 2015 entitled "Graphene Enhanced Piezoelectric Generator for Environmental Energy Conservation" that is incorporated herein in its entirety.

BACKGROUND OF THE INVENTION

Field of the Invention

The present invention relates to generation of energy and cells for storing the energy created and, more particularly, to a carbon battery using a graphene material and piezoelectric structure in liquid solution adapted to generate electrical energy in applications where alternative energy sources, for example, solar energy is impractical.

Background of the Invention

Systems and methods for producing energy not derived from fossil or nuclear fuel may be termed renewable energy, sometimes referred to as "green" energy, includes any naturally occurring source of energy such as, for example, biomass, solar, wind, tidal, wave, and hydroelectric power. Renewable energy is an attractive alternative to fossil and/or nuclear fuels because it is theoretically inexhaustible energy source. While developments have advanced technologies based on biomass, solar, wind, tidal, wave, and hydroelectric power for large industrial applications, other individual and portable sources of renewable energy for personal use are not equally available.

In some cases green energy cannot be used because it does not suit the environment. For example, solar energy cannot be generated in a dark or rainy region. Wind energy cannot be used without consistent wind. Renewable energy for personal use is not yet available and is a problem in rural areas, such as at night when the individual desires to light a space in the home, in an emergency when power has been lost (e.g. monsoon season), during camping use, and for other applications. There is a need, as it would be advantageous, for an improvement in the generation of renewable energy for personal use using mechanical motion from sources in nature available to such person. As a result, there is a long felt for a device to solve these problems. In this regard, appellant's invention provides such improvement in a device to solve these and other known problems known but not solved prior to the invention.

While the primary use is personal, when used in aggregate, the invention can also have larger scale commercial applications. If multiple instances of the invention were used simultaneously they could generate enough power for a commercial use. For example if multiple instances of the invention were placed in moving water, such as on a shoreline, stream or dam, the individual energy generated in the devices could be harvested for larger scale use.

The present invention provides an article of manufacture in the form of a device system and method suitable for providing renewable energy in sufficient amounts for the cost to translate available mechanical energy effectively for as long as the mechanical energy is available. Additionally, the materials used in the construction of the article of manufacture are durable and may be safely disposed such that the disposal is environmentally safe with respect to soil and water degradation. The present invention provides a self-contained device that has application to individuals for turning mechanical energy into electrical energy using the new construction of materials such as graphene combined with a piezoelectric structure.

SUMMARY OF THE INVENTION

It is an object of the present invention to provide a graphene enhanced piezoelectric article of manufacture, system and method of energy generation that can be operated for as long as mechanical energy is available.

It is an object of the present invention to provide a graphene enhanced piezoelectric article of manufacture, system and method of energy generation to generate renewable energy for personal use using mechanical motion from sources in nature available to such person.

It is an object of the present invention to provide a graphene enhanced piezoelectric article of manufacture, system and method of energy generation to generate in a self-powered system that obtains energy from environmental motion forces present in the environment utilizing graphene enhanced piezoelectric generator device. The graphene enhanced piezoelectric generator device is configured to collect and store the energy so as to provide a self-powered system with application in generation of renewable energy for personal use using mechanical motion from sources in nature available to such person.

It is an object of the present invention to provide a graphene enhanced piezoelectric article of manufacture, system and method of energy generation to generate renewable energy for personal use using mechanical motion from sources in nature available to such person by combining solid graphene in a liquid suspension with piezoelectric materials.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
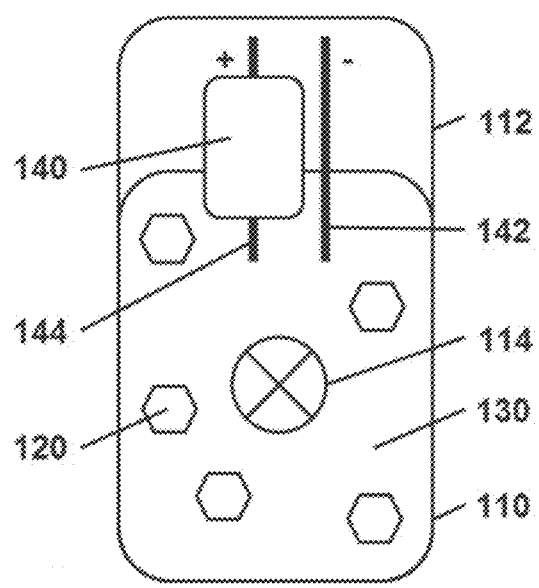
FIG. 1 illustrates a schematic view of a graphene enhanced piezoelectric article of manufacture, system and method of energy generation according to an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Figure 3A:
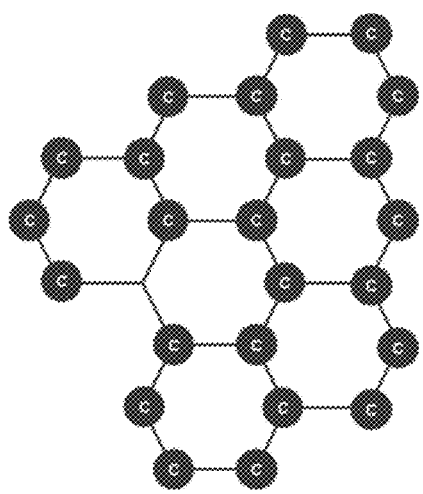
FIG. 3A illustrates the graphene structure.

As used herein the term "Graphene" refers to a carbon lattice from six carbon atoms covalently bonded to one another in a hexagon shape and/or a materials having six carbon atoms covalently bonded to one another in a hexagon shape made from the isolation of graphite sheets as a covalent-network solid. Graphene sheets are "2D" material with properties including extraordinary conductivity (i.e. being more conductive than copper), stronger than steel, and other applications such as flexible electronics and very strong filters as shown in FIG. 3A.

Figure 3B:
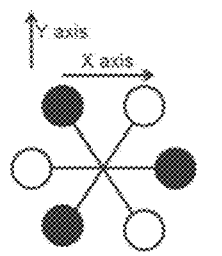
FIG. 3B illustrates the principal of the piezoelectric structure and piezoelectric effect for the generation of renewable electricity according to an embodiment of the present invention.
Figure 3B:
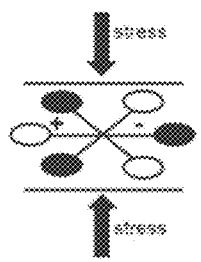

As used herein the term "Piezoelectricity" refers to the electric charge that accumulates in certain solid materials in response to applied mechanical stress. Piezoelectricity is from emitted electrons and/or electrical charge when the material is compressed or distorted as the materials normally balanced internal charge repel the polarities of the charge to generate a positive and negative flow of electricity as shown in FIG. 3B.

As used herein the term "Piezoelectric" and/or "Piezoelectric materials" refer to materials such as crystals, certain ceramics, and biological matter such as bone, DNA and various proteins that emit an electrical charge when compressed or distorted, and, alternatively, when compressed or distorted give an electrical charge. The piezoelectric effect characteristic is found in certain materials and may be utilized in the embodiments of to translate mechanical energy into electrical energy. Suitable piezoelectric materials may be utilized in the embodiment of the present invention to transfer between mechanical and electrical energy include the crystalline (e.g. monocrystalline) form of quartz, tourmaline, and Rochelle salt (e.g. Potassium Sodium Tartrate). Rochelle salt has the chemical equation of:

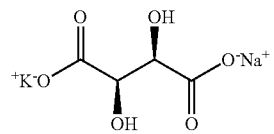

Equation 1

While these crystalline piezoelectric materials are disclosed for the purposes of presenting the basic structures of the present invention, one of ordinary skill in the art will appreciate that other variations are possible which would still fall within the scope of the present invention.

As used herein the term "polycrystalline ferroceramic material" refers to polycrystalline, non-centrosymmetric materials, their piezoelectricity is induced by the so-called poling process that is based on the principle of polarization reversal by the action of an electric field that characterizes the ferroelectric material. Suitable polycrystalline ferroceramic materials may be utilized in the embodiment of the present invention such as, for example, barium titanate (BaTiO3) and lead zirconate titanate (PZT) an exemplary embodiment. Piezoelectric materials may be considered renewable energy sources as they do not require fossil fuels or toxic chemicals to generate electricity. While these polycrystalline ferroceramic materials are disclosed for the purposes of presenting the basic structures of the present invention, one of ordinary skill in the art will appreciate that other variations are possible which would still fall within the scope of the present invention.

As is illustrated in FIGS. 1 through 5, according to an embodiment of the present invention, a graphene enhanced piezoelectric device, system and method of energy generation 100 may comprise an enclosure 110, graphene material 120 and piezoelectric material 130 suspended in solution, and an electric circuit assembly 140 comprised of a capacitor 142 operatively connected to the graphene material 120 and piezoelectric material 130 in supersaturated solution 132 so as to supply a voltage via anode wire 144 and a ground via cathode wire 146. The elements of the graphene enhanced piezoelectric device 100 are preferably biodegradable whereby the graphene material 120 (i.e. is carbon that exists in nature); the piezoelectric material 130 (i.e. the Rochelle salt is water soluble and edible) of and the solution (i.e. water). Only the capacitor 142 and electrical wires 144, 146 are not biodegradable whereby the design of the graphene enhanced piezoelectric device 100 produces significantly less waste than a traditional battery according to the present invention.

According to an embodiment of the graphene enhanced piezoelectric device 100 may be configured with an agitator 113 in order to enhance the movement between the graphene material 120 and piezoelectric material 130 in solution 132. The agitator 114 (e.g. a rock) may be disposed or otherwise added inside the container 110 to hit the sides when jolted and thereby create additional current and/or voltage for storage in the capacitor 142. The agitator 114 is preferably biodegradable and a rock agitator 114 is suitable as it originates from the earth.

According to an embodiment of the present invention, of the graphene enhanced piezoelectric device 100, the graphene material 120 may comprise graphene oxide material as an Example 1. Graphene Oxide may be used in dispersion the solution 132 combination with the piezoelectric effect materials 130 in the various combinations according to the disclosed embodiments of the present invention. Graphene Oxide is available from Graphenea Inc., Cambridge, Mass., product "Graphene Oxide (0.5 mg/mL, Water Dispersion 250 mL)" available at <http://Graphenea.com>.

According to an embodiment of the present invention, of the graphene enhanced piezoelectric device 100, the graphene material 120 may comprise material of Graphene Nano platelets in combination with the piezoelectric effect materials 130 as an Example 2Graphine Nano platelets are available from ACS Material, LLC, Medford, Mass., product "Graphene Nanoplatelets (2-10 nm.)"<http://www.acsmaterial.com/product.asp? cid=28&id=90>.

Figure 2A:
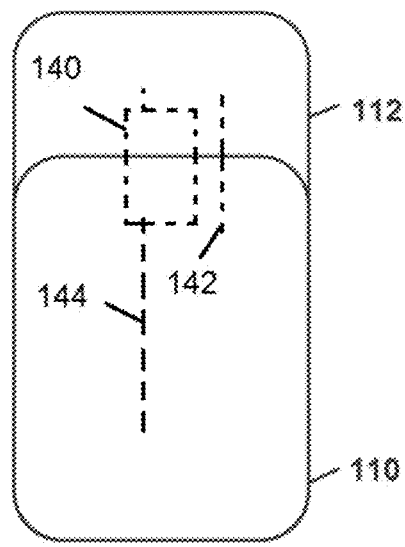
FIG. 2A illustrates a perspective side view of the biodegradable enclosure.
Figure 2B:
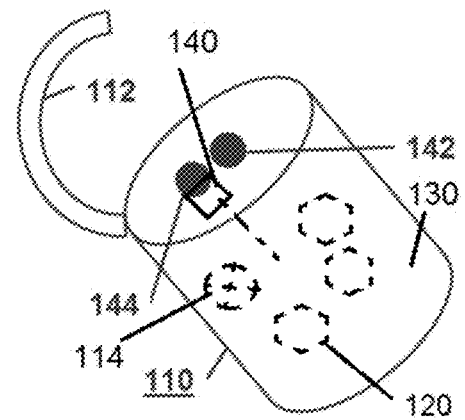
FIG. 2B illustrates a perspective view of the lid of the biodegradable enclosure according to an embodiment of the present invention.

The enclosure 110 may be made from biodegradable materials in a rounded and enlarged shape such as, for example, with biodegradable plastic, as to allow for easier integration to everyday uses as set forth in FIG. 2A. The enclosure 110 of the graphene enhanced piezoelectric device 100 is configured with a cap or lid 112 so as to provide access to the electrical connections of the anode wire 144 and cathode wire 146 as well as to provide protection from other environmental conditions as set forth in FIG. 2B. Suitable biodegradable plastic for enclosure 110 of the graphene enhanced piezoelectric device 100 design is available at <https://www.adafruit.com/>, Product ID 2504 for hand-moldable plastic low temperature thermoplastic. A 2-Oxepanone homopolymer is biodegradable within 180 days in a composting facility (ASTM-D640014)

As is illustrated in FIG. 1, the capacitor 142 of the graphene enhanced piezoelectric device 100 is configured to store and release energy like a battery. Suitable Capacitors are available at Mauser Electronics, Mansfield, Tex. <http://www.mouser.com/> in the form of supercapacitors and ultra-capacitors under the product name "nichicon" Part No. 647-JUWT1105MCD Mfg. No. JUWT1105MCD. According to an embodiment of the present invention, the graphene enhanced piezoelectric device 100 and method of energy generation may comprise material of Graphene Nano platelets in combination with the piezoelectric effect materials and a capacitor 132.

According to an embodiment of the present invention, the graphene enhanced piezoelectric device 100 has numerous applications and is configured to collect and store the energy so as to provide a self-powered system with application in generation of renewable energy for use using mechanical motion from sources in nature available to such person. For example, the graphene enhanced piezoelectric device 100 may be used on a small scale such as, for example, being carried by a person whereby the motion of carrying around with a few on their bike or in a pocket throughout the day, then using the stored energy for light and warmth at night. The graphene enhanced piezoelectric device 100 could also power devices, and charge them, powered by the motion of carrying around. Other motion present in the natural environment can power, and charge the graphene enhanced piezoelectric device 100 such as, for example, from a wind motion (e.g. hanging from a tree in a windy place), motion from water or liquid currents (e.g. tidal, placing in a stream of water), motion from animals (e.g. attaching and harnessing motion from livestock, dog, pet, etc.), and recombinant energy motion (e.g. placing in a washer, motion from other machine used for another purpose).

Figure 3C:
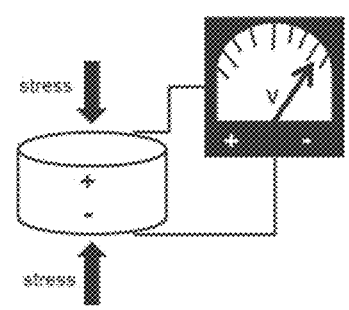
FIG. 3C illustrates a hydraulic application for the generation of renewable electricity according to an embodiment of the present invention.

In an alternative embodiment of the present invention, the fluid dispersion of the solution 132 of the graphene enhanced piezoelectric device 100 may be adapted for use as a hydraulic fluid such that compression under pressure products an electric current. As illustrated in FIGS. 3A through 3C, graphene enhanced piezoelectric device 100 can produce sufficient power if the container 110 has sufficient wall design so as not to rupture when used as a hydraulic fluid device such as, for example, electrical power is generated as stresses are applied to the liquid solution in a hydraulic system with the stresses applied as shown in FIGS. 3B and 3C. In this manner, the fluid dispersion of the solution 132 of the graphene enhanced piezoelectric device 100 may be adapted for use as a hydraulic fluid such that compression under pressure products an electric current.

Figure 4:
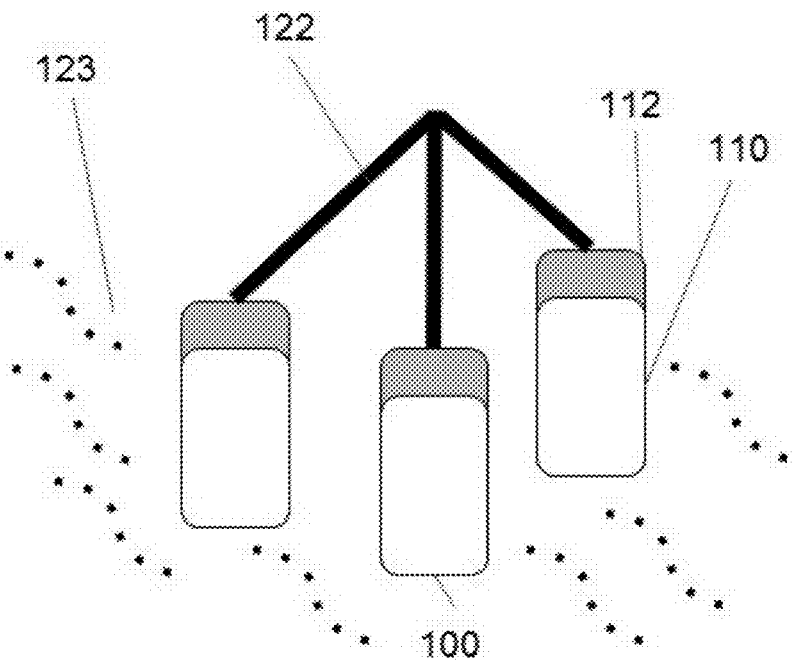
FIG. 4 is a schematic side view illustrating the graphene enhanced piezoelectric device used in the generation of renewable electricity according to an embodiment of the present invention.

Referring to FIG. 4, according to an additional embodiment the graphene enhanced piezoelectric device 100 can be configured as a system of one or more the graphene enhanced piezoelectric devices 100. For example, a system can be configured for use on a much larger scale, such as depositing a mass of the graphene enhanced piezoelectric devices 100 using a suspension device 112 in flowing water 123 (e.g. a river) and then later harvesting them for large scale electrical energy that is completely clean as the biodegradable design allows for the use of the graphene enhanced piezoelectric device 100 in the most protected natural habitats as well as high movement (and high mechanical energy) dense urban environments. The graphene enhanced piezoelectric device 100 can also work with existing renewable energy systems such as, for example, in conjunction with a solar installation whereby one or more graphene enhanced piezoelectric devices 100 may be placed to collect water motion (and thus mechanical energy) to create electricity during rain storms when available but the sun is not. In this manner, the fluid dispersion of the solution 132 of the graphene enhanced piezoelectric device 100 may be adapted for use with natural motion present in the environment to produce an electric current.

Figure 5:
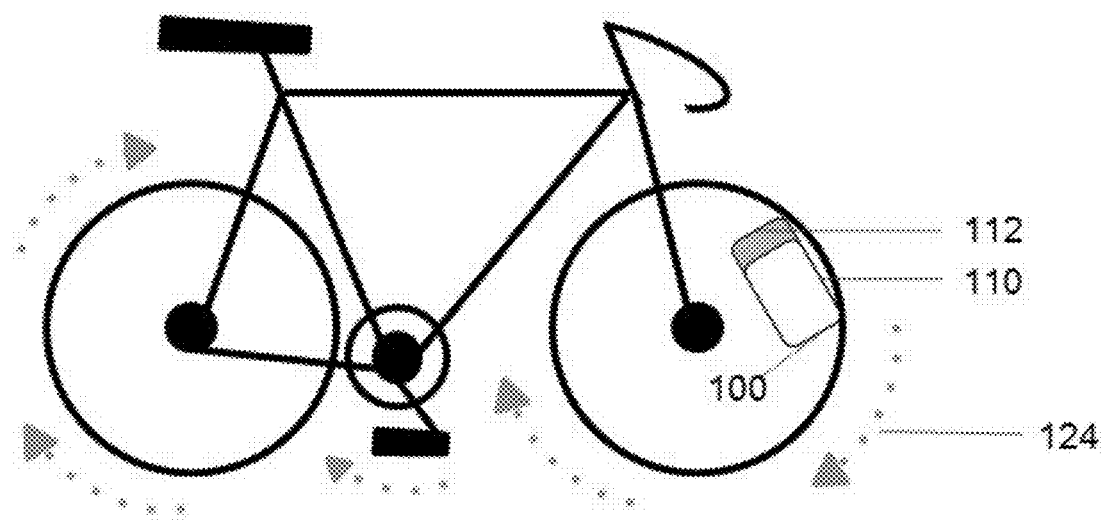
FIG. 5 is a schematic diagram illustrating the graphene enhanced piezoelectric device used in the generation of renewable electricity according to yet another embodiment of the present invention.

Referring to FIG. 5, according to another embodiment and use of the present invention, the fluid dispersion of the solution 132 be adapted for use to harness energy a centripetal force such as, for example, using the mechanical rotation 124 of the bicycle pedals or wheels on any wheel of a vehicle or turbine. Other designs of the graphene enhanced piezoelectric device 100 may use the normal motion of a person or animal in yet another embodiment and use of the present invention. For example, the fluid dispersion of the solution 132 of the graphene enhanced piezoelectric device 100 may be adapted for use by carrying within the lining of clothing. In another example, the fluid dispersion of the solution 132 of the graphene enhanced piezoelectric device 100 may be adapted for use in liquid "flow" battery designs such that the suspension of graphene and the solution with excess piezoelectrics in liquid generates electron power when agitated. In this manner, the fluid dispersion of the solution 132 of the graphene enhanced piezoelectric device 100 may be adapted for use with natural motion of a person, or human operated devices, in normal day-to-day-activities to produce an electric current so as to charge the battery for later use.

According to an embodiment of the present invention, the graphene enhanced piezoelectric device 100 may have graphene material 120 and piezoelectric material 130 in a solution comprising a supersaturated solution. The ratio of water to graphene material to piezoelectric material should be such that the solution is in excess with piezoelectric material. Exact ratios of piezoelectric material, water and graphene will vary based on the piezoelectric material chosen. It will be appreciated by one skilled in the art that combinations of graphene and other selected piezoelectric materials may be used to form the graphene enhanced piezoelectric device of the present invention. For example, a piezoelectric material, Rochelle salt, performed well with a ratio of in approximate amounts, by weight in grams:

graphene material 120 (0.9%) in suspension
piezoelectric material 130 (9.6%) or 3.8 Molal
in water (89.5%) sufficient to form a solution Accordingly, when tested, the above identified composition provided a graphene enhanced piezoelectric device with suitable output to provide power of sufficient, desired output, for example, to provide power sufficient to light an electric light bulb. Data from applicant's testing was conducted using the ratios described above for a graphene enhanced solution using Rochelle Salt as the piezoelectric source. In such composition 10.74 grams of Rochelle salt were mixed into 100 grams of water and stirred. Adding 1 gram by weight of graphene nanoplatelets that was then stirred into the solution. The resulting graphene enhanced piezoelectric solution was tested for voltage output that produced 0.687 volts. The results were compared to a control comprising 10.74 grams of Rochelle salt mixed into 100 grams of water and stirred. The resulting graphene enhanced piezoelectric solution was tested for voltage output that produced 0.119 volts. Accordingly, the voltage increased in a proportion of 1035% volts with the addition of the graphene material to the solution. This is an example, as other compositions may be formed to achieve such ration and/or the ratios may be adjusted based on the composition of the piezoelectric material or so as to achieve desired voltage output for a particular design of the enclosure, the function of the electric circuit attached and/or as a way to control power management.

According to tests of the graphene enhanced piezoelectric device 100 of the present invention, electricity may be formed and stored in the capacitor 132 as follows:

|  | Attempt 1 | Attempt 2 | Attempt 3 | Average |
|---|---|---|---|---|
| Control: External air | 0.0049 V | 0.0030 V | 0.0038 V | 0.0039 V |
| Test 1: Solution without capacitor | 0.0080 V | 0.0090 V | 0.008 V | 0.0083 V |
| Test 2: Solution with capacitor | 0.572 V | 0.572 V | 0.564 V | 0.5693 V |

While certain configurations of structures have been illustrated for the purposes of presenting the basic structures of the present invention, one of ordinary skill in the art will appreciate that other variations are possible which would still fall within the scope of the appended claims. For example, applications further exist where many conventional devices could incorporate the graphene enhanced piezoelectric device 100 directly into devices so as to make them self-powered, such as computer mice or remote controls. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An article of manufacture for generating electrical power comprising:
   one or more enclosures comprising a vessel with a lid, each of said enclosures formed from sufficient strength to withstand motion through use;
   an agitator disposed in said enclosure;
   a liquid solution composition disposed in said enclosure, said liquid solution composition consisting of in approximate percentage weight of total liquid solution percentage (100%), as follows:
      graphene material between about 0.8 and 1.0 percent (%), said graphene material comprises graphene material from the group consisting of Graphene Oxide and/or Graphene Nano platelets;
      piezoelectric material between about 8.0 and 10.0 percent (%), said piezoelectric material comprises a Rochelle salt;
      water between about 89.2 and 91 percent (%) sufficient to form a solution to produce electrical current; said liquid solution being disposed in said enclosure and said Rochelle salt being soluble in said water;
   an electronic circuit assembly operably coupled to said liquid solution composition, said electronic circuit comprising:
      a capacitor disposed in said lid having a wire extending through said lid to said liquid solution composition in said vessel and another wire extending to the exterior of said lid from said capacitor forming an anode wire;
   a cathode wire extending through said lid to said liquid solution composition in said vessel;
   said capacitor capable of storing an electrical charge produced by the agitation of said liquid solution composition.

2. The article of manufacture of claim 1, whereby the graphene material is about 0.9% percent by weight of the total liquid solution composition percentage.

3. The article of manufacture of claim 1, whereby the piezoelectric material is about 9.6% percent by weight of the total liquid solution composition percentage and/or 3.8 Molal.

4. The article of manufacture of claim 1, whereby water is about 89.5% percent by weight of said total liquid solution composition percentage.

5. The article of manufacture of claim 1, whereby said agitator is a rock.

6. The article of manufacture of claim 1, whereby said enclosure formed from biodegradable material.

7. A method of generating an electrical charge, the method comprising the steps of:
   agitating a liquid graphene piezoelectric solution in an enclosure sufficient to produce an electrical charge, said liquid qraphene piezoelectric solution consisting of in approximate percentage weight of total liquid qraphene piezoelectric solution percentage (100%), as follows:
- graphene material between about 0.8 and 1.0 percent (%), said graphene material comprises qraphene material from the group consisting of Graphene Oxide and/or Graphene Nano platelets;
- piezoelectric material between about 8.0 and 10.0 percent (%), said piezoelectric material comprises a Rochelle salt;
- water between about 89.2 and 91 percent (%) sufficient to form a solution to produce electrical current; said liquid solution being disposed in said enclosure and said Rochelle salt being soluble in said water;

storing said electrical charge in a capacitor disposed in said lid of said enclosure with an anode wire thereof operably coupled to said liquid graphene piezoelectric solution and the other wire of said capacitor extending from said lid; and using said electrical charge stored in said capacitor by connecting said anode wire extending from said lid of said capacitor and cathode wire operably coupled to said liquid graphene piezoelectric solution at one end and having another end of said cathode wire extending from said lid to a device.

* * * * *